Patented Sept. 9, 1941

2,255,605

UNITED STATES PATENT OFFICE 2,255,605

MANUFACTURE OF 1-CHLORO, 3-BROMO PROPANE

Robert Erwin Windecker and Anton Schormuller, Painesville, Ohio

No Drawing. Application July 25, 1939, Serial No. 286,409

10 Claims. (Cl. 260—658)

This invention relates to the manufacture of 1-chloro, 3-bromo propane (CH$_2$Cl—CH$_2$—CH$_2$Br)

particularly for use in the production of cyclopropane. Stated in a more specific manner, the invention relates to an improved process for the conversion of allyl chloride (CH$_2$=CH—CH$_2$Cl) into 1-chloro, 3-bromo propane. The principal object is to lower the ultimate cost of producing cyclopropane. Other objects of a more limited character will become apparent as the description proceeds.

We are aware that prior to our invention olefine halides of the type of allyl chloride have been converted to di-halides of the type of 1-chloro, 3-bromo propane by a high pressure reaction with hydrogen bromide involving cooling the olefine halides to low temperatures, for example minus 50 degrees centigrade, sealing in a confined space and then elevating to room temperature or higher.

We have discovered a method whereby allyl chloride can be converted into 1-chloro, 3-bromo propane at ordinary temperatures and pressures, for example 70° F. and one atmosphere, involving only such apparatus as is usual in liquid-gas contact reactions, that is, merely by passing hydrogen bromide into allyl chloride. Our departure from obvious procedure consists in three factors, viz., (1) Use of aged allyl chloride. (2) Absorption of a small amount of water in the allyl chloride prior to treatment with hydrogen bromide, and (3) Use of bismuth trichloride as a catalyst.

We do not fully understand the nature of the aging process. The beneficial effect is not appreciable at the end of two days after distillation. It becomes marked at the end of a week, more marked at the end of the second week, and reaches a maximum in the period from three to four weeks. After the fourth week there is no further increase, although there is no deterioration so far as we have observed. The effect appears to be independent of the presence of atmospheric gases; at any rate no considerable amount of such gases is necessary since we have observed the effect both where the allyl chloride is aged in a container partly filled with air and in a glass container distilled full of allyl chloride and sealed. The aging effect is lost upon redistillation of the aged material.

The optimum amount of water appears to be that which is absorbed when an excess of water is agitated with allyl chloride, the mixture allowed to stand for one hour and the undissolved water removed. The undissolved water is readily removed because of the stratification which occurs. Larger amounts of water are unnecessary and harmful in that they dissolve hydrogen bromide and reduce the yield. Smaller amounts of water reduce the desirable effect.

Bismuth trichloride, employed in quantity of the order of 0.1% to 1.0%, suitably two to four grams per pound of allyl chloride, is decidedly the most effective catalyst, although bismuth tribromide and the other chlorides, bromides and iodides of the heavy metals of the fifth group of the periodic system yield improvements of lesser degree.

In the preferred practice of our invention, previously aged allyl chloride is saturated with water, bismuth trichloride is added and hydrogen bromide is passed in against a small back pressure at ordinary temperature. By this method we have produced a conversion to 1-chloro, 3-bromo propane of 86% of theoretical in twenty-three hours.

The following table of experimental values indicates roughly the effect of the various promotion factors on the yield.

| Time | Promotion factors | Yield |
|---|---|---|
| | | Percent |
| 23 hours | Aging; water; BiCl$_3$ | 86 |
| 48 hours | Aging; BiCl$_3$ | 43 |
| 36 hours | Aging | 32 |
| 72 hours | Water; BiCl$_3$ | 35 |
| 72 hours | BiCl$_3$ | 20 |
| 72 hours | | 10 |

In the foregoing table, the first column indicates reaction time. "Aging" indicates that the allyl chloride was aged for a time of from three to four weeks or more. "Water" indicates that the allyl chloride was substantially saturated with water. "BiCl$_3$" indicates that bismuth trichloride was used as a catalyst to the extent of about 0.5%. The yield is in per cent of theoretical based upon the amount of allyl chloride present at the beginning of the reaction.

We believe that the advantage of the use of water is primarily related to the catalyst, that is, that water enhances the effect of the catalyst far more than could be expected from the effect of either water or the catalyst, alone or in connection with aging.

Our process preferably is carried out at room temperature (60° to 70° F.) although other temperatures, for example, 40° F. to 100° F. may be used. Room temperature is desirable as avoiding expense and unnecessary equipment such as series absorption towers, refluxing columns, etc. Likewise, we prefer to operate at or about atmospheric pressure to avoid the use of expensive and dangerous pressure equipment. We have used pressures up to 10 pounds per square inch above atmospheric, and consider pressures of the order of one to two atmospheres advantageous in plant operation. Still higher pressures, e. g. three atmospheres, will shorten the reaction period but the economy of their use is questionable.

*Example I*

100 parts by weight of allyl chloride were aged one month, saturated with water and to the resulting material was added bismuth trichloride at the rate of two grams per pound. Hydrogen bromide was passed in for a period of twenty-three hours at a temperature of 60° F. to 70° F. against a back pressure of two pounds per square inch. The yield of 1-chloro, 3-bromo propane was 86% of theoretical and no substantial amounts of 1-chloro, 2 bromo propane were produced, unreacted allyl chloride accounting for substantially all the remaining 14%.

*Example II*

100 parts by weight of allyl chloride aged more than three weeks over calcium chloride, to which 0.5 part anhydrous bismuth chloride was added, was treated by passing in hydrogen bromide for thirty-six hours at 70° F. and 2½ pounds back pressure. The yield of 1-chloro, 3 bromo propane was 32% of theory.

*Example III*

100 parts by weight of allyl chloride were aged for more than one month in the presence of anhydrous calcium chloride. Anhydrous bismuth chloride to the amount of about 0.5 part was added and hydrogen bromide passed in for forty-eight hours. The yield of 1-chloro, 3-bromo propane was 43% of theory.

What we claim is:

1. A process for converting allyl chloride to 1-chloro, 3-bromo propane comprising dissolving water in allyl chloride which has been aged not less than a week and treating the resulting substance with hydrogen bromide in the presence of a catalyst selected from the group consisting of the chlorides, bromides and iodides of the heavy metals of the fifth group of the periodic series.

2. A process according to claim 1 wherein the catalyst is bismuth trichloride.

3. A process for converting allyl chloride to 1-chloro, 3-bromo propane comprising aging allyl chloride for a period not less than one week, dissolving water therein to approximate saturation and passing in hydrogen bromide in the presence of bismuth trichloride.

4. A process according to claim 3 wherein the concentration of bismuth trichloride is not less than approximately two grams per pound of allyl chloride.

5. A process for converting allyl chloride to 1-chloro, 3-bromo propane comprising aging allyl chloride for a period not less than three weeks, dissolving water therein to approximate saturation and passing in hydrogen bromide in the presence of bismuth trichloride.

6. In a process of converting allyl chloride to 1-chloro, 3-bromo propane by treatment with hydrogen bromide, the preliminary step of aging the allyl chloride for a period not less than three weeks.

7. In a process of converting allyl chloride to 1-chloro, 3-bromo propane, the steps of aging the allyl chloride for a period of not less than three weeks, and passing in hydrogen bromide in the presence of bismuth trichloride at a temperature between 40° F. and 100° and at a pressure from atmospheric to ten pounds per square inch above atmospheric until a substantial portion of the allyl chloride is converted.

8. In a process of converting allyl chloride to 1-chloro, 3-bromo propane, the steps of aging the allyl chloride for a period of not less than three weeks, dissolving water therein, and passing in hydrogen bromide in the presence of bismuth trichloride at a temperature between 40° F. and 100° F. and at a pressure from atmospheric to ten pounds per square inch above atmospheric until the major portion of the allyl chloride is converted.

9. In a process of converting allyl chloride to 1-chloro, 3-bromo propane, the steps of aging the allyl chloride for a period of not less than three weeks, saturating the same with water, and passing in hydrogen bromide in the presence of bismuth trichloride at a temperature between 40° F. and 100° F. and at a pressure from atmospheric to ten pounds per square inch above atmospheric until the major portion of the allyl chloride is converted.

10. In a process of converting allyl chloride to 1-chloro, 3-bromo propane, the steps of aging the allyl chloride for a period of not less than three weeks, and passing in hydrogen bromide in the presence of bismuth trichloride until a substantial portion of the allyl chloride is converted.

ROBERT ERWIN WINDECKER.
ANTON SCHORMULLER.